United States Patent [19]
Bird et al.

[11] Patent Number: 5,959,617
[45] Date of Patent: Sep. 28, 1999

[54] LIGHT PEN INPUT SYSTEMS

[75] Inventors: Neil C. Bird, Horley; Oliver S. Davies, London, both of United Kingdom

[73] Assignee: U.S. Philips Corporation, New York, N.Y.

[21] Appl. No.: 08/692,145

[22] Filed: Aug. 5, 1996

[30] Foreign Application Priority Data

Aug. 10, 1995 [GB] United Kingdom .................. 9516441

[51] Int. Cl.⁶ ...................................................... G09G 5/00
[52] U.S. Cl. ............................................ 345/182; 345/184
[58] Field of Search ..................................... 345/182, 180, 345/181, 184, 183

[56] References Cited

U.S. PATENT DOCUMENTS

| 4,209,255 | 6/1980 | Heynau et al. | 345/8 |
| 5,151,688 | 9/1992 | Tanaka et al. | 345/182 |

FOREIGN PATENT DOCUMENTS

| 0491436A2 | 6/1992 | European Pat. Off. . |
| 0572182A1 | 12/1993 | European Pat. Off. . |
| 0587236A2 | 3/1994 | European Pat. Off. . |

*Primary Examiner*—Richard A. Hjerpe
*Assistant Examiner*—Henry N. Tran
*Attorney, Agent, or Firm*—Brian J. Wieghaus

[57] ABSTRACT

A light pen input system includes a light sensing device (10) having a row and column array of light sensing elements (14) over which a light pen (12) is moved to write in information, e.g. for display on a display screen, the light beam emitted by the pen producing a light spot (20) on the array which covers, and is sensed by, adjacent elements and which, with the beam directed perpendicularly to the array, is substantially non-circular in shape, having dimensions in two directions over the array which differ from one another. Rotation of the pen around its axis is then detectable, providing additional functionality. An elongated light spot, e.g. elliptical, rectangular or triangular, provides further capabilities in enabling the width of a written stroke to be varied by twisting the pen.

15 Claims, 5 Drawing Sheets

LIGHT PEN INPUT SYSTEMS

BACKGROUND OF THE INVENTION

This invention relates to a light pen input system comprising a light pen which emits a light beam and a light sensing device comprising a planar array of light sensing elements in rows and columns over which the light pen is moved, the light beam emitted from the light pen producing a light spot on the array which is sensed by the sensing elements.

Examples of such systems are described in EP-A-0 491 436, EP-A-0 587 236 and EP-A-0 572 182, in which the light sensing element array is integrated with a liquid crystal display element array to provide a combined display output and light sensing input system. In EP-A-0 491 436 and EP-A-0 487 236 the light sensing element array consists of a two-dimensional, planar, row and column matrix of photoelectric elements, such as photodiodes, photoresistors, or the like, which are addressed via sets of row and column address conductors. Light emitted from a light pen and falling on sensing elements in the array produces electrical responses which are detected by a detector circuit connected to the sets of row and column address conductors that provides an output indicative of the elements illuminated. In EP-A-0 572 182 two sets of optical light guides are provided extending in X and Y directions respectively, which define at their intersections a two-dimensional, X-Y, matrix of sensing elements. The sets of light guides are connected at their ends to respective photosensing circuits which produce an electrical signal in response to light being conducted thereto by the light guides. Light from a light pen falling on the area of an intersection between a light guide of each set produces outputs from the photosensing circuits which uniquely identify the area concerned.

Similar kinds of light sensing devices without a combined display element array can be used as a pen input device to a personal computer or other data processing equipment having a separate display.

The combination of a light pen and light sensing device can be used, for example as a graphics tablet type input device for a computer system, in a manner similar to that provided by alternative kinds of input devices which utilise resistive, acoustic, induction or electrostatic sensing techniques, in which the X–Y position of the pen as it moves over the array is sensed and an output provided accordingly to the computer system. The combined light display/sensing devices can be used in equipment such as notebook computers, PDAs, electronic message pads, notebooks, organisers and the like to enable information to be displayed and inputted using a light pen whereby, for example, as the light pen is moved over the surface of the light sensing array not only is the X–Y movement of the pen sensed but also the signals obtained indicative of the pen position are used to produce a display output from the display element array in accordance with such movement to give the impression of writing on paper.

It should be understood that the term light used herein is intended to include both visible and non-visible, e.g infrared, electromagnetic radiation.

Light pens commonly used in such systems comprises a source of light, for example an LED or semiconductor laser, a power supply and a lens arrangement which concentrates the light and directs an output beam through the tip of the pen. The light beam is such that, with the pen held perpendicularly to the plane of the sensing element array, the light spot produced is substantially circular. An example of light pen is described in EP-A-0 572 182 in which the pen's output is pressure responsive with the diameter of a light spot produced by the pen on a writing surface of the light sensing device is increased as the pen is pressed harder against the surface so that, in effect, thick and thin lines can be drawn by the user varying the pressure of the pen on the surface to control the diameter of the light spot incident on the sensing element array, and thus the number of sensing elements upon which the beam is incident at any given time.

SUMMARY OF THE INVENTION

It is an object of the present invention to provide a light pen input system which is capable of offering greater flexibility in use.

It is another object of the present invention to provide a light pen input system in which the light pen offers more functionality.

According to the present invention, there is provided a light pen input system of the kind described in the opening paragraph and in which the light spot covers a plurality of adjacent sensing elements, which is characterised in that, with the beam directed perpendicularly to the plane of the array, the light spot is substantially non-circular having a dimension in one direction over the array different to the dimension in another direction over the array. By virtue of this non-circular shape of the light spot, then, compared with a circular spot, an additional degree of freedom is given to the light pen which, in conjunction with the light sensing device, enables it to be used to further effects by allowing more input functions to be performed.

The shape of the light spot is preferably symmetrical around at least one axis. Besides being more convenient to an operator in terms of controllability and generally simpler to produce reliably, a shape having a symmetrical property makes it easier for a centroid of the spot to be deduced by a processing circuit associated with the sensing element array compared with, for example, a wholly irregular spot shape. The light spot could be, for example, substantially square shaped, or in the shape of an equilateral triangle. The X–Y position of the light spot on the array and movement of the light spot in X–Y directions over the sensing element array corresponding to movement of the light pen are detectable as in the known systems, the sensing elements which are illuminated during movement of the spot being determined by the overall dimension of the spot in the direction perpendicular to the direction of movement. Advantageously, however, the dimensional distinction along different directions of the light spot can be utilised to allow rotation of the light pen around its axis also to be detected. As the pen is rotated about its axis then different ones of the sensing elements will be illuminated and nonilluminated and thus rotation, and also the degree of pen twisting, can be sensed. This capability enables different user interface concepts to be exploited. Thus, for example, assuming the light pen input system is used to control the position of a cursor on a display screen, a control knob could be displayed on the screen and the cursor used to rotate the on-screen control knob merely by positioning the cursor over the knob by moving the light pen over the array and then rotating the pen around its axis. Depending on the equipment concerned, this action with a virtual control knob can be used to perform, for example, various control functions conventionally performed by real control knobs but simulated on-screen.

In a preferred embodiment, the shape of the light spot is such that its overall dimensions in the direction of a line of symmetry and in a direction perpendicular to that line or in perpendicular directions through a centre of symmetry are substantially different, that is, the shape is elongated in one direction. For example, the spot shape may be oval, in the shape of an elongate, pointed triangle, or on the shape of a parallegram. In another preferred embodiment, however, the elongated shape is symmetrical about two perpendicular axes, for example, an ellipse or an elongated rectangle. The elongated nature of the light beam spot enables the light pen to be used to added advantage for other purposes. More especially, when drawing a line by moving the pen over the sensing element array, a user can selectively control the thickness of the drawn line by twisting the pen to alter the orientation of the light spot in relation to the direction of movement in equivalent manner to the effects obtained with the blade nib of an italic pen writing on paper. Consequently, italic characters, Kanji characters and the like can be written into the system very easily. The pen can be used in this manner for other purposes, such as inputting graphical information using the pen as a paint brush and varying the thickness of the brush stroke selected by rotating the pen.

The spot shapes mentioned above relate to the light pen, and more particularly the optical axis of the emitted light beam, being orientated perpendicularly to the plane of the sensing element array. It will be understood, of course, that if the pen is held inclined to that plane, the shape of the light spot produced is distorted. By appropriately inclining the pen, the spot produced could be further elongated or, contrarily, could be made less elongated. For example, in the case of an elliptical spot, the spot may be distorted to approximate a circular spot. It will be appreciated, therefore, that in the hands of a skillful operator, considerable flexibility is afforded.

BRIEF DESCRIPTION OF THE DRAWINGS

Embodiments of light pen input systems in accordance with the present invention will now be described, by way of example, with reference to the accompanying drawings, in which.

It should be understood that the Figures are not drawn to scale and that certain dimensions have been exaggerated whilst others may have been reduced. The same reference numerals are used throughout the Figures to indicate the same or similar parts.

DETAILED DESCRIPTION OF THE PREFERRED EMBODIMENTS

Figure 1:
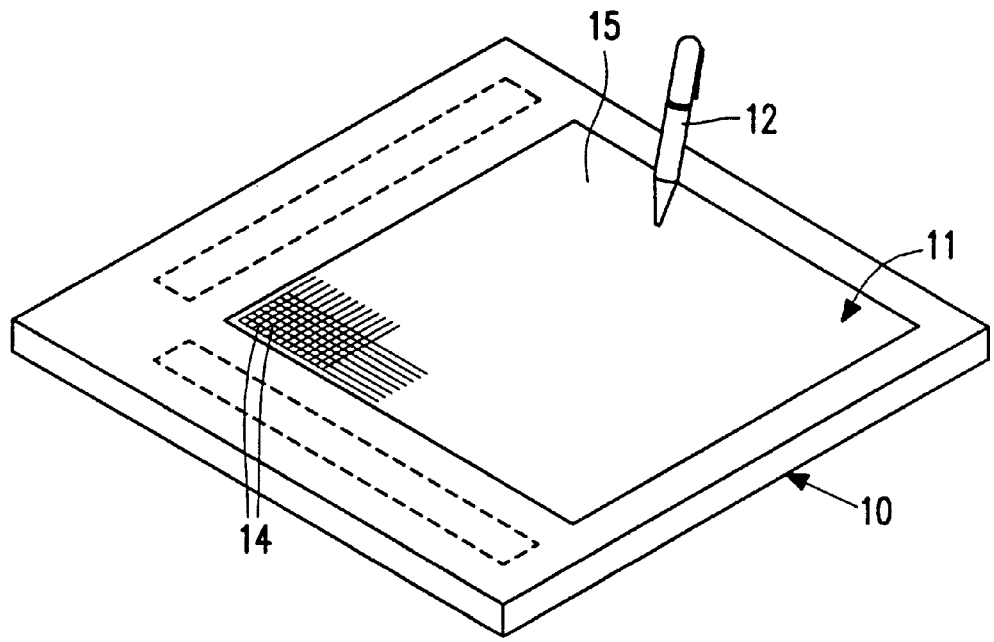
FIG. 1 shows schematically an embodiment of a light pen input system according to the invention.

Referring to FIG. 1, the system comprises a light sensing device 10 which consists of a large area two-dimensional X–Y array of light sensing elements 14 defining a sensing area 11 having a writing surface over the surface of which a light pen 12 can be moved by a user to input information. The light beam emitted by the light pen 12 causes a response in the sensing elements which is detected by peripheral drive circuits. The sensing elements are arranged regularly-spaced in a row and column matrix array and are addressed by the drive circuit via crossing sets of row and column conductors, each sensing element being located at the intersection between a respective one of the row conductors and a respective one of the column conductors, whereby each sensing element can be addressed, and its condition sensed, individually. By way of example, the pitch of the sensing elements in both the row and column directions may be around 100 or 200 micrometers. The pitch can be varied according to the required resolution. In the case of the sensing element array being combined with a display device, the pitch will be dependent on the pitch of the display pixels.

The light sensing device can be of any known kind having a row and column, planar, array of light sensing elements. The sensing elements may comprise any suitable photosensitive device such as a photoresistor or photodiode. In this particular embodiment, the device 10 is of the type in which the light sensing element array is integrated in a liquid crystal display panel to form a single unit 15 providing input and display output functions. Examples of such integrated light sensing and display panels are described in the aforementioned EP-A-0 491 436 and EP-A-0 587 236 to which reference is invited and whose disclosure are incorporated herein. In these examples, both the light sensing elements and the LC display elements are actively addressed using TFTs as switching devices and each light sensing element includes a TFT, a capacitance and a photosensitive device in the form of a photoresistor or a photodiode. The display elements are connected to sets of row and column electrical conductors via which they are addressed. The light sensing array could instead be provided as a separate component and arranged overlying a conventional active matrix LC display panel, the light sensing array being adequately transparent to allow information displayed on the LC panel to be visible therethrough. Such forms of combined light sensing and display devices are suitable for use, for example, in personal digital assistants (PDA) devices, notebook computers, electronic message pads, organisers and the like. The light sensing element array need not, however, be combined with a display panel and instead may be used, for example, as a graphics tablet whose output is supplied to a data processing system such as a personal computer, computer or a process control system having a separate display screen upon which information input through the screen is displayed. Moreover, the light sensing element array may be of a kind which does not use a photoelectric device at each sensing element location but instead uses sets of row and column light waveguides which define at the intersections a planar array of light sensing elements and which conduct input light to peripheral light sensors, for example as described in aforementioned EP-A-0 572 182.

The light pen 12 includes a light source, for example an LED or a semiconductor laser, and a power supply for powering the light source, with electrical power to the light source being controlled by a switch operable either manually by a user or indirectly in response to pressure upon the pen being brought into contact with the writing surface of the sensing element array. The pen may instead be connected via a lead to a remote power supply or to a remote light source via an optical fibre. Light from the light source, which may be visible or non-visible, for example, infra-red light, is emitted from the pen in the form of a shaped light beam by optical means contained in the pen.

The light beam emitted from the pen is such that with the pen, and thus the main optical axis of the emitted beam, perpendicular to the plane of the array, the light spot produced on the array by the beam in operation is substantially non-circular and has a dimension in one direction over the array which is different to the dimension in another direction. The shape of the incident spot of illumination on the writing surface is determined by the pen optics and these are arranged so that, with the pen axis extending orthogonal to the writing surface, the projected point illumination area on the sensing element array is non-circularly symmetrical around the perpendicular to the plane of the writing surface and the area of the light spot incident on the array when writing is sufficient to cover at least two but preferably considerably more, adjacent sensing elements. A variety of shapes of the light spot can be employed to provide this non-circularly symmetrical requirement. Several examples will now be described with reference to FIGS. 2 to 8, which each show schematically in plan view a typical portion of the sensing element array. In all these Figures, the shape of the light spot produced on the sensing element array, with the light pen orientated perpendicularly to the plane of the writing surface, is depicted to illustrate its relationship with individual sensing elements in the row and column array. The sensing elements are represented schematically as simple, regularly-spaced, squares 14. It will be appreciated, though, that the shape of the sensing elements, defining their light-receptive area, can be varied and in the case, for example, of the light sensing elements being actively addressed by means of a switch device such as a TFT or two-terminal, non-linear, device located in close proximity to the light sensing element or in the case of integrated display/sensing panel in which the light sensing elements and display elements are provided alongside one another, the shape of the light sensing elements would typically be non-quadrilateral.

For convenience, the light spots in FIGS. 2 to 8 have deliberately been shown comparatively small in size in relation to the sensing element pitch. Although such comparatively small spot sizes could be used, the size of the light spot in practice would preferably be selected, having regard to resolution requirements, so as to cover considerably more sensing elements. Typically, the spot would be arranged to cover a group of between 20 and 100 adjacent sensing elements.

Figure 2:
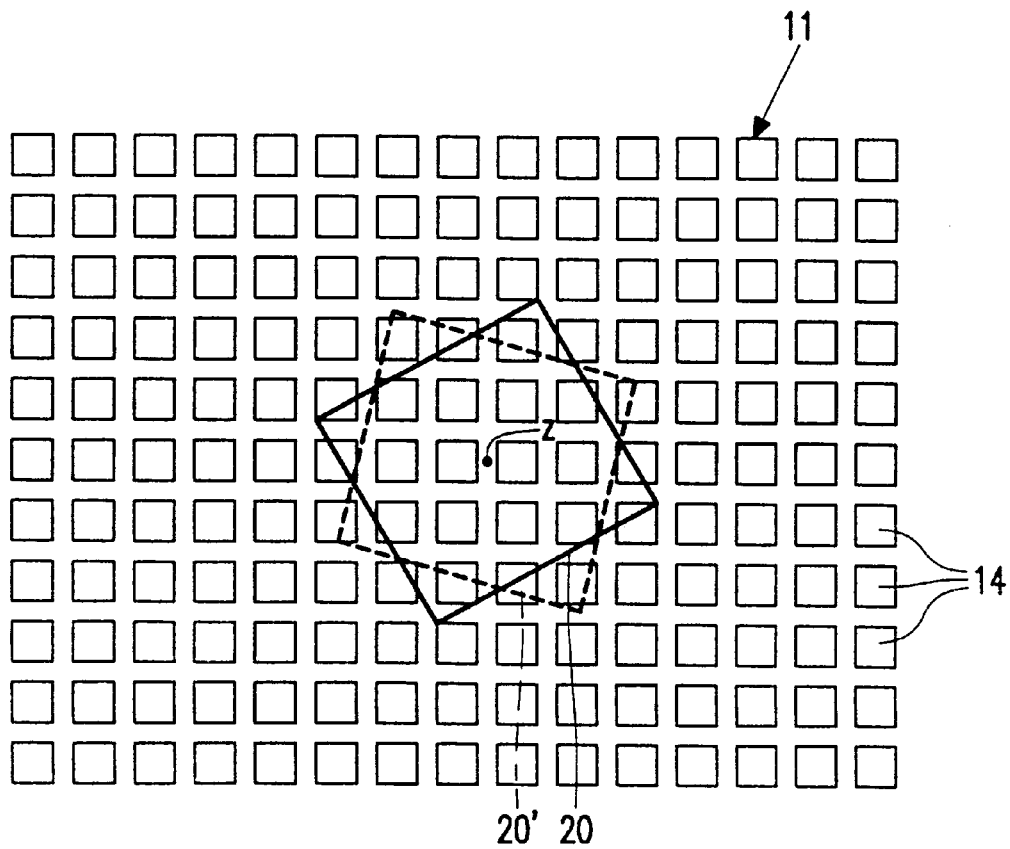
FIGS. 2 to 8 illustrate schematically in plan view a typical portion of a sensing element array of the system of FIG. 1 and various example shapes of the light spot produced thereon by a light beam from a light pen.
Figure 3:
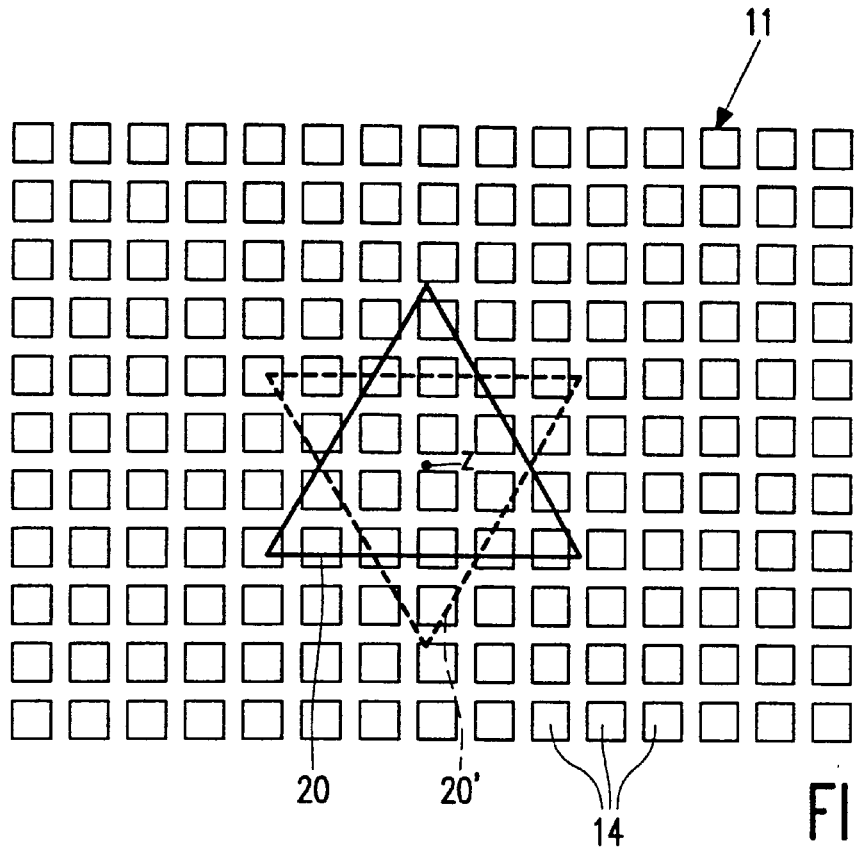
Figure 4:
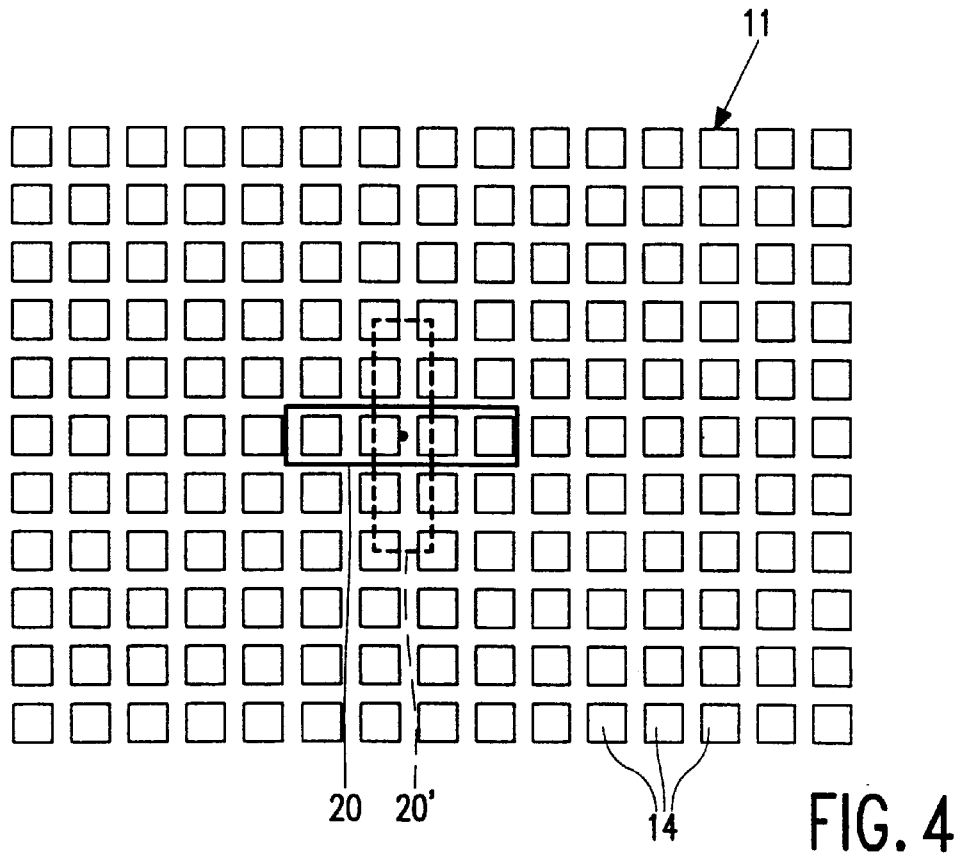
Figure 5:
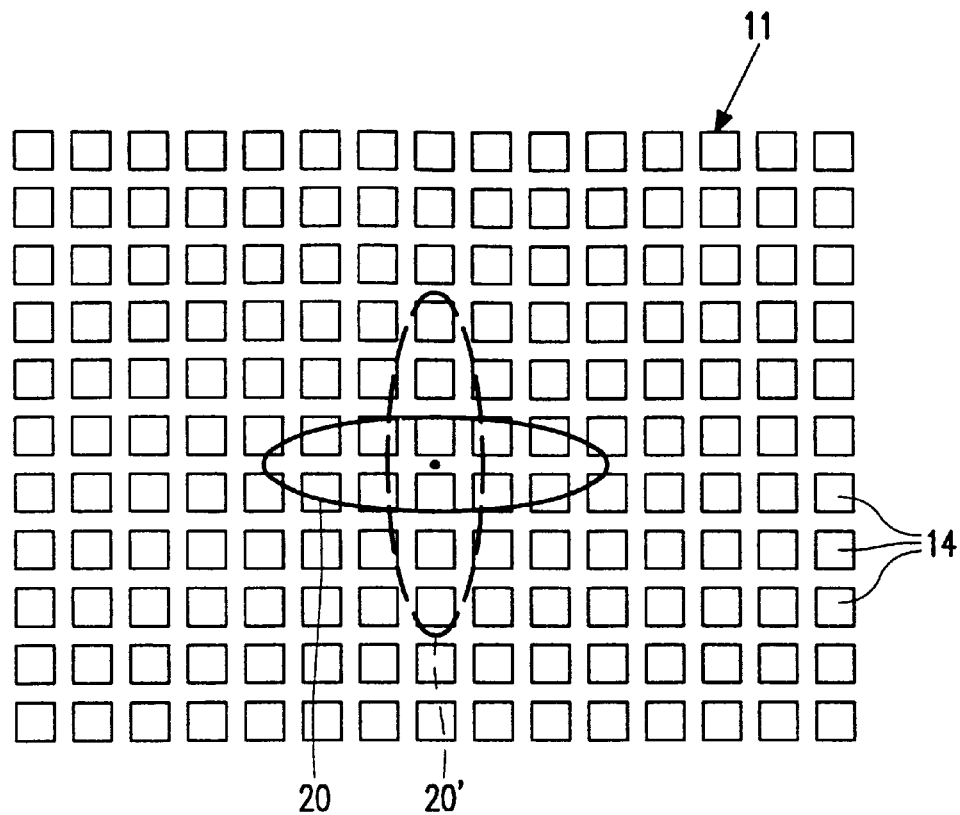
Figure 6:
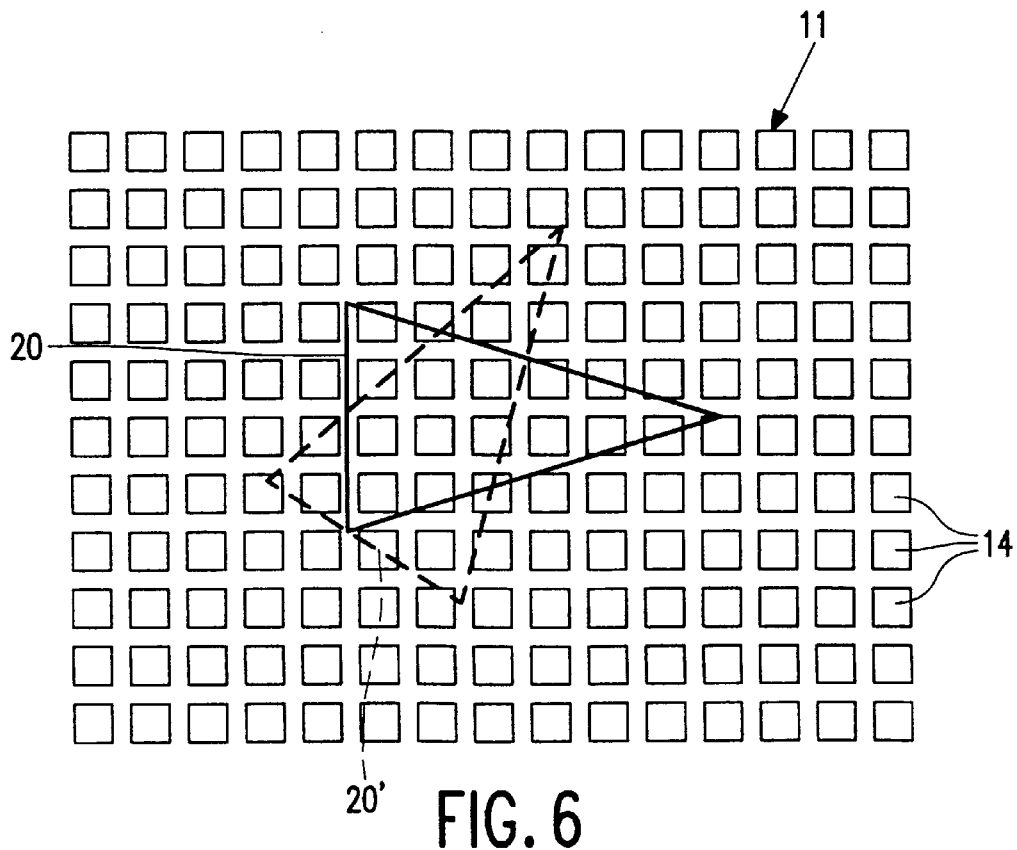
Figure 7:
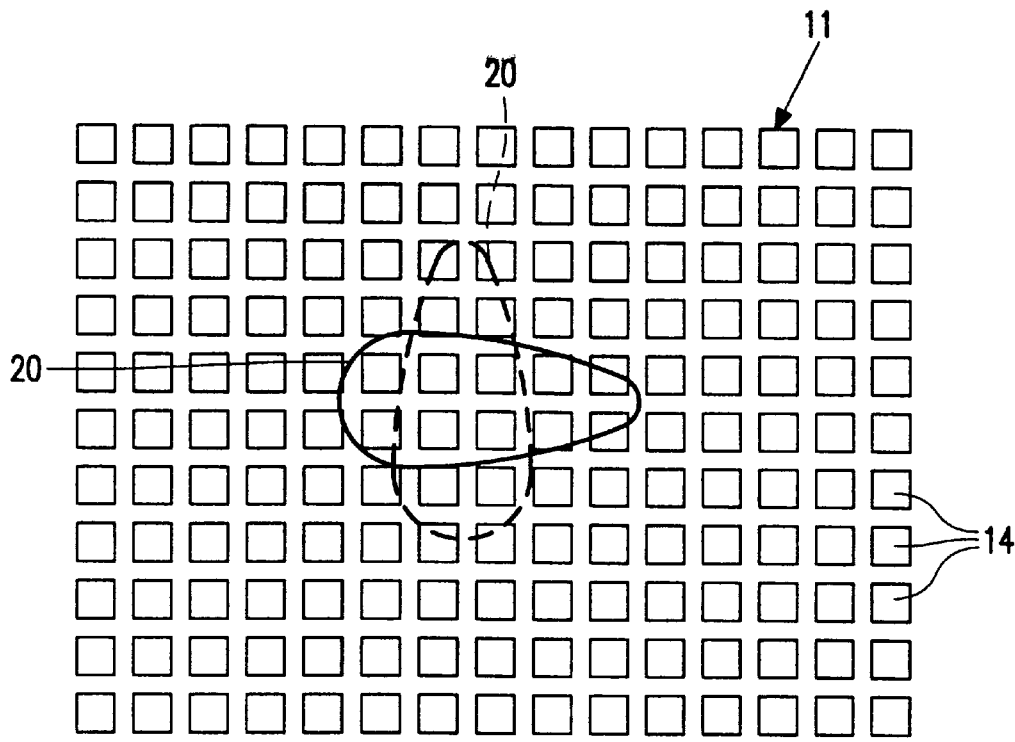

Referring to FIG. 2, the beam from the pen produces a light spot, indicated at 20, which has a substantially square shape. The square light spot incident on the array covers several adjacent sensing elements. In the example of FIG. 3, the light spot produced by the beam 20 has the shape of an equilateral triangle of dimensions such that the area of the spot covers several adjacent sensing elements. With regard to both FIGS. 2 and 3, if the light pen is held at a fixed position over the array and is rotated around its longitudinal axis, which, it is assumed, coincides with the emitted beam's main optical axis and intersects the plane of the array at the point Z corresponding to the centre of the square in FIG. 2 and the centre of the triangle (as defined by the point of intersection of its three axes of symmetry), then the light spot projected on the array similarly rotates about the point Z from the original orientation with respect to the sensing elements, as shown in solid lines, to a different orientation, as shown for example in dotted outline at 20' (corresponding to a rotation around the axis of an odd number multiple of 45° in FIG. 2 and an odd number multiple of 60° in FIG. 3). In so doing, it is seen that although the same sensing elements closest to the axis through Z remain illuminated, different sensing elements around the periphery become illuminated, while others previously illuminated become non-illuminated. By monitoring the sensing elements outputs the changing pattern of illuminated elements can be detected and the direction of rotation of the beam determined, which information can then be used to provide functionality in addition to that obtained in the conventional manner of use merely by moving the light pen over the array and sensing the pen's position on the array in two coordinates. For example, in use with an associated display screen, a depiction of a control knob may be displayed which can be "turned" by a user holding the light pen on the displayed knob and twisting the pen, or by moving the pen to position an on-screen cursor over the knob and twisting the pen in the case of a separated display screen. As rotation of the pen is detected the display can be addressed to re-draw the knob rotated according to the amount of rotation of the pen to provide visual feedback in addition to the detection of the action being used by the system to perform the desired function. The ability to detect pen rotation in this way enables systems designers to incorporate novel user interfaces. For example, the interaction between a user and on-screen virtual knob as described can be used to provide in systems with which the pen-input system is being used control switch and adjustment functions such as volume and brightness settings etc in multimedia PCs to replace manually-operable electromechanical control knobs. In other types of equipment, such as process control systems, on-screen simulations of valves or screws could be controlled.

Further examples of substantially non-circular light spots similarly providing this capability and which offer further functionality will now be described with reference to FIGS. 4 to 8. These spot shapes are distinguished over those of FIGS. 2 and 3 in that they exhibit pronounced elongation in one direction, with the dimensions of the spot in two perpendicular directions being substantially different, whereas in the spot shapes illustrated in FIGS. 2 and 3 the overall dimensions of the spots in two perpendicular directions are substantially the same, and differ by only a comparatively small amount respectively. As a consequence of this difference, yet further functionality can be obtained.

Referring to FIGS. 4 to 8, the shapes of the spots are, respectively, rectangular, elliptical, elongated (isosceles) triangular, ovoid, and non-rectangular parallelogram. As before, the Figures illustrate the corresponding shape of the light spot 20 incident on the array assuming the beam axis is perpendicular to the plane of the array. Also, an example of the change in orientation of the spot produced when the pen is twisted around its axis is similarly shown in dotted outline at 20'. As with the previous examples, rotation of the pen/light beam around its axis can readily be detected by virtue of different sensing elements 14 away from the centre of the spot becoming illuminated and non-illuminated during such rotation. Because of the elongated nature of the shape of the spot, then the number of sensing elements which become illuminated as the spot rotates through a given angle will be comparatively large, so the detection of rotation becomes easier and more reliable. This elongation also enables further functions to be provided. With regard to the beam spot shapes depicted in FIGS. 2 and 3 it will be appreciated that as the pen is moved over the array the thickness of the line "drawn" on the array, corresponding to the width of the trace of the light spot, will not vary significantly regardless of any rotation of the pen around its axis. On the other hand, because the dimensions of the light spots in FIGS. 4 to 8 differ substantially in perpendicular directions, the width of the line drawn as the pen is moved over the array is dependent on the orientation of the spot in relation to the direction of pen movement and can be varied in thickness by rotating the pen around its axis. Thus, for example, the trace produced by the spots of FIGS. 4 and 5 can be varied between approximately a thickness corresponding to the number of sensing elements across its width and the number of sensing elements across its length. The additional ability to vary the thickness of the trace by twisting the pen around its axis while moving the pen over the writing surface of the array can be used for a variety of purposes, such as the writing of italic and Kanji characters or simply drawing lines of variable thickness.

Figure 8:
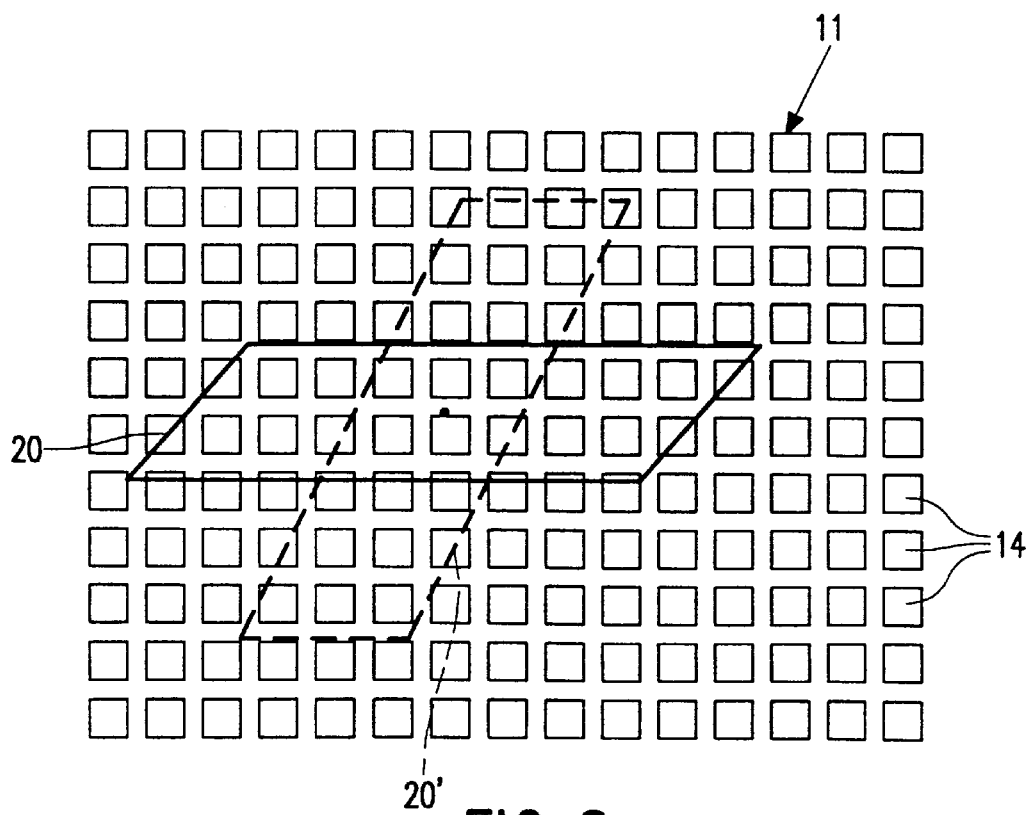

The light spots shown in FIGS. 2 to 8 all exhibit symmetry around at least one axis. Those of FIGS. 6 and 7 exhibit line symmetry around just one line while those of FIGS. 2 to 5 are symmetrical around a plurality of lines, and that of FIG. 8 is symmetrical around a central axis. The symmetrical properties of their shapes inter alia, enable the centroid of the spot to be deduced more readily (in processing circuitry associated with the array) and makes for easier and more reliable control of inputs by a user, although other shapes satisfying the dimensional requirements could be used, for example a right angle triangle or possibly even a wholly irregular shape. The shape of the light spot selected has an effect on the degree of pen rotation that can readily be detected. Thus, rotation of a square shape and an equilateral triangle spot up to 90° and 120° respectively can be detected whereas rotation of an elliptical or rectangular spot though 180° can be detected, and rotation of an elongated, isosceles, triangle or ovoid spot shape can be detected through a full 360°.

By tilting the light pen away from the perpendicular, the shape of the light spot produced on the array can be distorted so as to elongate (or further elongate) the spot or contract the spot if desired thus providing additional flexibility to an operator. Such distortion could be used to overcome problems of parallax due to the plane of the array being spaced from the writing surface by, for example, the thickness of a glass plate.

Figure 9:
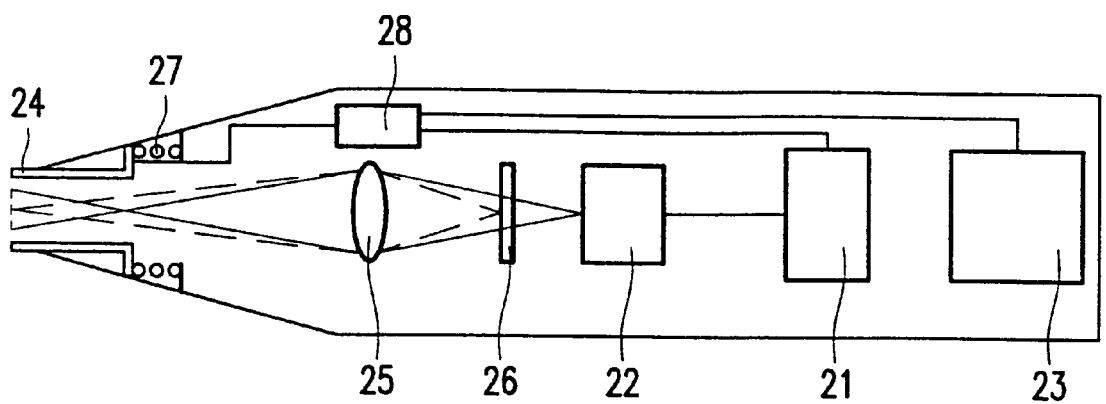
FIG. 9 shows schematically the components of a light pen of the system of FIG. 1.

FIG. 9 illustrates schematically an example of the light pen 12. The pen includes a power supply 23 from which power is supplied via a control circuit 21 to a light source 22 such as an LED or semiconductor laser, that upon being energised emits a beam of light. The beam of light is directed through the pen tip 24 via an optical system 25 which includes an aperture 26 that determines the required shape of the light spot and a lens 25 which focuses the aperture 26 to form an image of the aperture at a position close to the end of the tip 24 of the pen, and thus the writing surface of the sensing array in use, and preferably in the plane of the sensing elements. The pen tip 24 is resiliently displaceable, by means of a spring 27, towards the interior of the pen housing and is coupled to a switch 28 connected to the control circuit 21 for controlling the supply of electrical power to the light source 22 such that the light source becomes energised when the tip 24 is pressed against the writing surface, causing it to operate the switch 28. In an alternative optical arrangement, the disposition of the lens 25 and aperture 26 may be reversed with the lens being spaced from the light source 22 by a distance corresponding to its focal length so as to provide a substantially parallel light beam. The aperture 26, defining the required spot shape, is arranged in the path of the parallel light beam to produce a parallel light beam whose cross-section, perpendicular to the beam axis, is of the required shape, this cross-sectional shape corresponding to the shape of the spot produced on the array with the beam axis perpendicular to the plane of the array.

Figure 10:
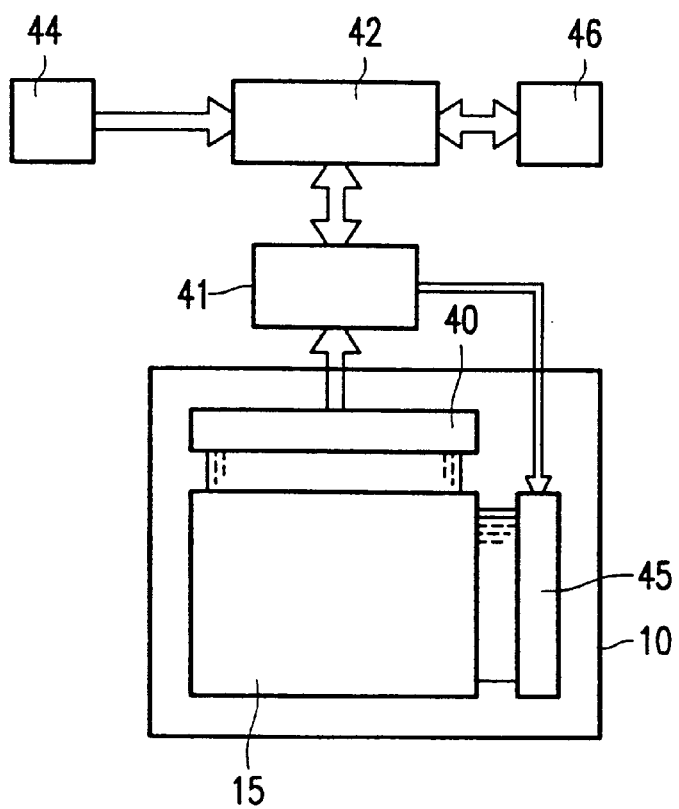
FIG. 10 illustrates in simple block form an example of equipment using the light pen input system.

As previously mentioned, the system of FIG. 1 can be incorporated in a variety of equipment. FIG. 10 is a highly simplified schematic block diagram of a typical product, in this case an electronic message pad type product, using the system. Input information to the light sensing array of the combined sensing/display panel 15 is detected by the associated detection circuit, here referenced at 40, which detects X–Y position and twist of the pen and provides outputs accordingly to a central processing unit 42 via an input/output interface 41. Operation of the CPU 42 is determined by software stored in an associated memory 44. The CPU processes the information and supplies information through the interface 41 to a display drive circuit 45 of the LC display panel which drives display elements of the display as information is being written in with the light pen thus creating an impression of writing on paper. The mode of operation of the unit 42 is controlled, for example, via a dedicated control function region of the display and sensing area responsive to a pen input. For example a mode button or knob could be operated using the twist capability to implement character recognition to decipher input handwriting. Processed information corresponding to the user's handwritten entry is then retained in a store 46 and a representation or other information presented on the display panel. Virtual control knobs can be used to control such parameters of the selection of stored entries, the speed of scrolling through output representations, as well as system controls like beeper volume under software control.

The size of the incident light spot on the array relative to the sensing elements may be varied from the particular examples illustrated in FIGS. 2 to 8. The selected spot size will be dependent on the size and pitch of the sensing elements in the column and row directions. In the spot shapes of FIGS. 4 and 6 for example, then the spot size on the array could conceivably be such as to cover just two adjacent sensing elements in the row direction and one element in the column direction. However, discrimination would be affected, the detection of angular rotation of the pen around its axis restricted to larger angles and the choice of trace widths limited. If the size of the spot is selected in relation to its shape such that it covers greater numbers of sensing elements, e.g. twenty or more, then smaller angles of rotation can be discriminated and a larger number of trace widths would be attainable.

From reading the present disclosure, other modification will be apparent to persons skilled in the art. Such modifications may involve other features which are already known in the field of light pen input systems and which may be used instead of or in addition to features already described herein.

We claim:

1. A light pen input system, comprising:
   (a) a light sensing device comprising a planar array of a large plurality of light sensing elements; and
   (b) a light pen which emits a light beam, the light beam producing a light spot on the array which light spot is sensed by the light sensing device, the light spot having an area corresponding to a plurality of adjacent light sensing elements, with the light beam directed perpendicular to the plane of the array, the light spot being non-circular and having a dimension in one dimension over the array different to the direction in another direction, and
   said light sensing device sensing rotation of the non-circular spot, whereby rotation of the pen by a user is sensed by the light pen system.

2. A light pen input system according to claim 1, characterised in that the shape of the light spot produced on the array is symmetrical around at least one axis.

3. A light pen input system according to claim 2, characterised in that the light spot is substantially square shaped.

4. A light pen input system according to claim 2, characterised in that the light spot is in the shape of an equilateral triangle.

5. A light pen input system according to claim 1, characterised in that the shape of the light spot is elongated.

6. A light pen input system according to claim 5, characterised in that the light spot has an elliptical shape.

7. A light pen input system according to claim 5, characterised in that the light spot has an ovoid shape.

8. A light pen input system according to claim 5, characterised in that the light spot has a rectangular shape.

9. A light pen input system according to claim 5, characterised in that the light spot is in the shape of a pointed triangle.

10. A light pen input system according to claim 5, characterised in that the light spot is in the shape of a parallelogram.

11. A light pen input system according to claim 1, characterised in that the light sensing element array is combined with an LC matrix display panel having an array of display elements, the array of display elements and the array of sensing elements being co-extensive.

12. Electronic equipment including a display screen and a light pen input system according to claim 1 in which display information displayed on the screen is controlled in accordance with outputs from the light pen input system.

13. A light pen input system according to claim 1, further comprising an array of display elements co-extensive with said light sensing elements, the display elements displaying a virtual rotary knob, and the sensing device sensing virtual rotation of the virtual knob when the light spot formed by the light beam of the pen is located at least adjacent the virtual knob and rotated by the user of the pen.

14. A light pen input system according to claim 1, wherein said light sensing device senses rotation of the light spot with movement along a line of motion, whereby a user of the light pen can change the thickness of a line drawn by the pen on the light sensing device.

15. A light pen according to claim 14, further comprising an array of display elements co-extensive with said light sensing elements for displaying a line drawn by a user of the light pen.

* * * * *

UNITED STATES PATENT OFFICE
CERTIFICATION OF CORRECTION

Patent No. 2,959,617 November 8, 1960

Blaine Chase McKusick et al.

It is hereby certified that error appears in the above numbered patent requiring correction and that the said Letters Patent should read as corrected below.

Column 3, line 5, for "N-methyl-N-vinylbenbenesulfonamide" read -- N-methyl-N-vinylbenzenesulfonamide --; column 6, line 32, for the claim reference numeral "2" read -- 1 --.

Signed and sealed this 25th day of July 1961.

(SEAL)
Attest:

ERNEST W. SWIDER
Attesting Officer

DAVID L. LADD
Commissioner of Patents